United States Patent

[11] 3,625,128

[72] Inventors Katsuhiko Nomura;
  Tadazumi Sakazaki, both of Tokyo-to, Japan
[21] Appl. No. 800,190
[22] Filed Feb. 18, 1969
[45] Patented Dec. 7, 1971
[73] Assignee Asahi Kogaku Kogyo Kabushiki Kaisha
  both of Tokyo-to, Japan
[32] Priority Feb. 22, 1968
[33] Japan
[31] 43/10789

[54] CAMERA SELF-TIMER
  9 Claims, 6 Drawing Figs.
[52] U.S. Cl. .................................................. 95/53.3
[51] Int. Cl. .................................................. G03b 9/64
[50] Field of Search .......................................... 95/53, 53.3, 53.6

[56] References Cited
UNITED STATES PATENTS

| | | | |
|---|---|---|---|
| 3,357,332 | 12/1967 | Helber | 95/53 |
| 3,418,910 | 12/1968 | Rentschler | 95/53.3 |
| 3,448,671 | 6/1969 | Rentschler | 95/53 |
| 3,513,762 | 5/1970 | Espig | 95/53.3 |

*Primary Examiner*—John M. Horan
*Attorney*—Stanley Wolder

ABSTRACT: A camera self-timer includes a spring-wound timing motor, a motor brake and a spring-raised shutter release rod. The depressing of the rod releases the brake and activates means for locking the rod in a depressed condition when the motor is charged. The closing of the camera shutter releases the rod to its raised condition and brakes the motor. The discharge of the timing motor releases the shutter. When the timing motor is in a discharged condition the shutter may be released merely by depression of the shutter release rod.

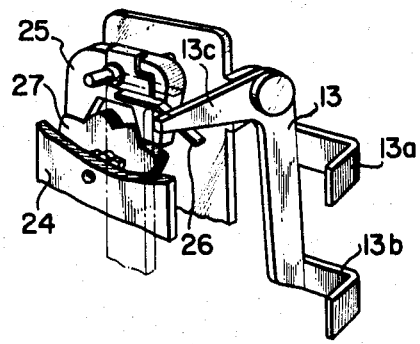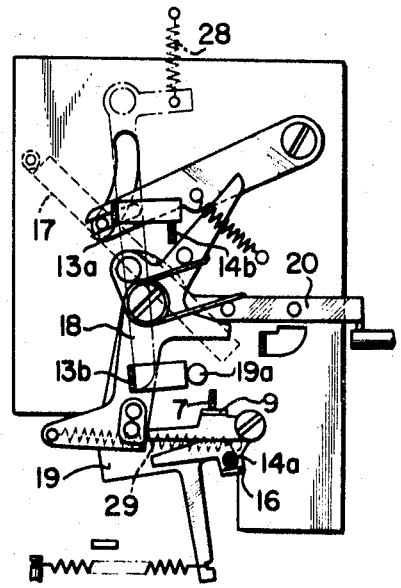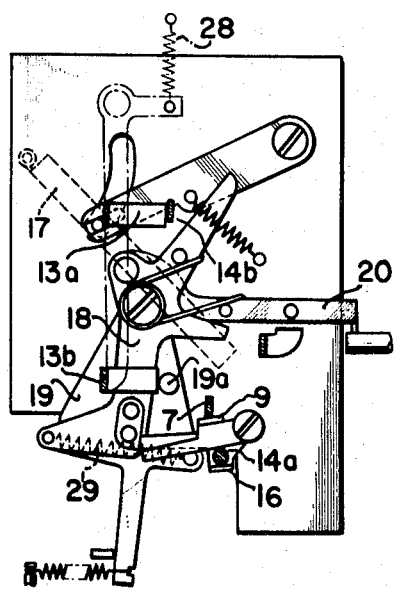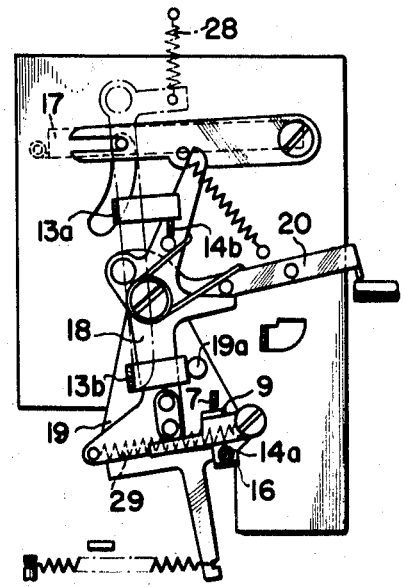

CAMERA SELF-TIMER

The present invention relates generally to improvements in cameras and it relates particularly to an improved camera shutter self-timing mechanism.

It is a principal object of the present invention to provide an improved camera self-timing mechanism.

Another object of the present invention is to provide an improved camera self-timing mechanism wherein the timing cycle is initiated by actuation of the shutter release button.

Still another object of the present invention is to provide an improved self-timing mechanism which controls the triggering of a variable-speed instantaneous shutter as well as the bulb operation of the shutter.

The above and other objects of the present invention will become apparent from a reading of the following description taken in conjunction with the accompanying drawings, wherein;

FIG. 3 is a fragmentary perspective view of the self-timer governor mechanism;

FIG. 4 is a fragmentary side elevational view of the improved mechanism shown in a normal photographing state with the self-timer uncharged;

FIG. 5 is a view similar to FIG. 4 employing the self-timer and following the depression of the shutter release and immediately prior to the retraction of the mirror; and FIG. 6 is a view similar to FIG. 5 with the mirror shown in its retracted position.

Figure 1:
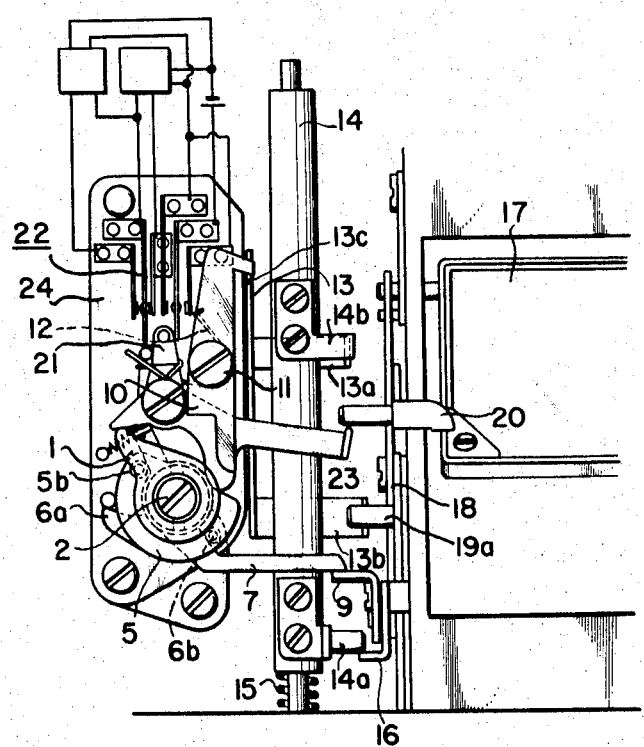
FIG. 1 is a fragmentary front elevational view of a mechanism embodying the present invention as employed in a single-lens reflex camera.

Referring now to the drawings which illustrate a preferred embodiment of the present invention the reference numeral 1 generally designates a cam lever mounted on a hollow shaft 1a which is rotatably supported on and proximate the free end of a spring-wound self-timer motor winding or charge shaft 2. A charge lever 3 is connected to shaft 1a by a coupling member 4. Hollow shaft 1a is provided with a rearwardly directed eccentric lug 1b, and a cam 5 is rotatably mounted on shaft 2 and has forwardly projecting lugs 5a lying in the path a lug 1b to form a lost-motion coupling therewith so that cam 5 is free during initial rotation of cam 1 and lever 3.

A lever 6 is fixed on charge shaft 2 and has an engaging step portion 6a projecting into the path of rotation of a pin 5b located on said cam plate 5 and a pin 6b located on an end opposite to step portion 6a. A shutter release starting lever 7 is rotatably mounted on charge shaft 2 so as to be driven by pin 6b against the action of a spring 8 provided between and end of shutter release starting lever 7 and a fixed point. Another end of lever 7 is confronted by an end of an engaging lever 9 which normally engages and holds a member for driving a mirror upward, as described later, at a position where said member is provided with an energy required for such a driving action.

A lever 10 is pivotally mounted on an axle 11 and biased by a spring 12 so as to be urged clockwise as viewed in FIG. 1. A lower end of lever 10 registers with cam 5 and the opposite end confronts a governor control lever 13 which is movable so as to intersect the path in which lever 10 is rotated by spring 12. A shutter rod 14 is adapted to be depressed against the action of a compression spring 15 and is provided adjacent its lower end with a pin 14a acting on an end of an engaging lever 16 which is pivoted coaxially with lever 9 so as to act on said member for driving in a manner similar to lever 9. Located on an intermediate portion of shutter rod 14 is an engaging leg or piece 14b which normally engages a projecting arm or piece 13a of said governor control lever 13 and, upon depression of shutter rod 14 for self-timer starting operation, advances from restriction of lever 13. A mirror 17 is controlled in the known manner by a mirror-driving mechanism including a mirror-driving lever 18 and a lever 19 for the storage of driving energy, both of these levers serving for driving the mirror upward. The energy storing lever 19 has a pin 19a fixed thereto so that pin 19a abuts against another projecting piece 13b on lever 13 at a position occupied by lever 19 prior to storage of driving energy. An automatic diaphragm driving lever 20 is associated with mirror driving lever 18. A changeover lever 21 of an exposure-setting electrical circuit for stopping down photometering and opening photometering is controlled by the rotary operation of lever 1 and cam plate 5. An end of changeover lever 21 is confronted by associated opposing changeover terminal arms of switch assembly 22. A stopping-down operation lever 23 interlocks with lever 21, acting on lever 20 so as to achieve driving operation for stopping said automatic diaphragm down independently of the mirror operation.

The governor mechanism as shown in FIG. 3 is arranged on the rear face of baseplate 24 which supports said changeover switch assembly 22. Governor control lever 13 has an end or arm 13c which is movable to depress an end of a leaf spring 26 projecting from an escapement ankle 25 and thereby prevent an escape wheel 27 from rotating. A spring 28 urges lever 13 from restraining ankle 25 and an energy-storing spring 29 is connected between lever 18 and lever 19.

In the operation of the improved mechanism, before winding the self-timer mechanism, the lever 6 occupies a position as shown in FIG. 1 at which position the pin 6b maintains the lever 7 depressed against the urging of spring 8. In this position, lever 7 holds lever 9 to a position as shown in FIG. 4 out of locking relationship with the mirror-driving lever 18. In normal photographing operation the shutter rod 14 may be depressed after shutter charge in order that the pin 14a on the lower end thereof depresses lever 16, releasing and allowing driving lever 18 to rotate, whereby a series of operations, namely, swinging the mirror 17 upward in a well-known manner, stopping the automatic diaphragm mechanism down and shutter release, are accomplished. For setting the exposure time (seconds) by a predetermined time control, a shutter control is set at a desired value of preset time (seconds) while, for setting bulb exposure, control of exposure time (seconds) during operation of depressing the shutter rod 14 is performed just a in a shutter mechanism of the conventional type.

Figure 2:
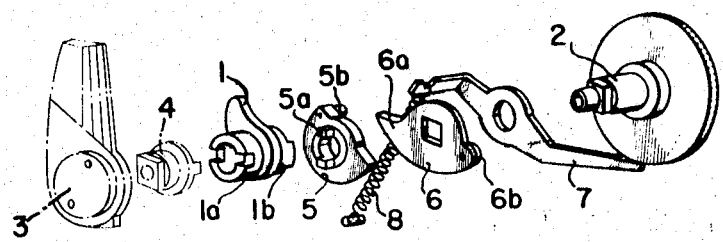
FIG. 2 is an exploded perspective view of the self timer loading assembly associated with the improved mechanism.

In operation aid of the self-timer mechanism, lever 3 may be initially rotated counterclockwise as viewed in FIG. 2 to accomplish self-charge. During initial rotation of lever 3, the lever 1 is rotated with the cam plate 5 and the changeover lever 21 operated by lever 1 and cam plate 5 accomplishes changeover of the photometric switch circuit 22. Subsequently, the pin 5b is driven by lever 3 to a position at which said pin 5b abuts step portion 6a of the lever 6. During this operation, the charge shaft 2 remains stationary. When lever 3 is further rotated, pin 5b rotates lever 6 and drives the charge shaft 2 so as to start the self-charge or winding operation. As lever 6 is rotated, the lever 7 which has been retained by the pin 6b is now rotated counterclockwise by spring 8 so that lever 9 is immediately restored to a position-locking lever 18, by lever 7. On the other hand, the governor control lever projecting piece 13a is engaged by the piece 14b of the shutter rod 14 as shown in FIG. 4 and its one arm 13c depresses the leaf spring 26. When the ankle 25 is urged against the escape wheel 27, the governor mechanism is nonoperative as seen in FIG. 3. The lever 10 normally engages and holds the governor control lever 13 at a position at which said governor mechanism is nonoperative. Within operative range of said lever 10 extending to a position at which said engaging lever 9 locks the mirror-driving lever 18 by the energy-storing operation of said charge lever 3, the one end of said lever 10 is urged by cam plate 5 so as to be rotated against the spring 12 counterclockwise while the other end thereof is retracted from a range of engagement with governor control lever 13. In this situation, the self-timer mechanism is operative and can accomplish the shutter release starting after operation for a time that depends on the energy stored by charge lever 3. To obtain an intended timer seconds, charge lever 3 may be further rotated to store in the timer mechanism an amount of energy enough and necessary for the time control.

Subsequently the film-advancing mechanism is advanced and the shutter mechanism cocked as described above, the energy-storing lever 19 being rotated counterclockwise whereby an energy-storing spring 29 is loaded for swinging the mirror upward and the pin 19a is positively retracted from engagement with the projecting piece 13b of the governor control lever 13. Then the shutter rod 14 is depressed for taking a shot. As a result, the pin 14a removes the engaging lever 16 from a range of engagement with the mirror driving lever 18 and at the same time the engaging piece 14b is lowered to a position at which said engaging piece 14b is disengaged from the projecting piece 13a. As a result, governor control lever 13 is rotated by spring 28 counterclockwise, releasing its end 13c from pressing on the ankle 25, and projecting piece 13a moves into a range which would be otherwise occupied by the engaging piece 14b as rod 14 is normally restored. Shutter rod 14 is thus held depressed as seen in FIG. 5. This operation disengages the lever 16 from the mirror-driving lever 18 while the other lever 9 remains in an engaging position due to the interlocking operation of lever 7 so that mirror driving lever 18 cannot drive the mirror 17 upward. The governor mechanism included in the self-timer mechanism is now free from blocking by the ankle 25 and begins to operate. The charge shaft 2 previously loaded is thus rotated back gradually. As charge shaft 2 is restored, the lever 6 is rotated clockwise with respect to FIG. 2 so that the pin 6b thereof may rotate the lever 7 against the urging of the spring 8 clockwise with respect to FIG. 2. Consequently, the engaging lever 9 is rotatably urged by lever 7 counterclockwise with respect to FIG. 5, releasing the locking effect on the mirror-driving lever 18. Mirror-driving lever 18 once disengaged operates with the energy stored by the spring 29 to accomplish the mirror driving and shutter release starting in a well-known manner as seen in FIG. 6. Upon completion of the shutter operation under time control, the energy-storing lever 19 is restored by the associated spring to a position, as shown in FIG. 4 at which position lever 19 was prior to storing an energy for driving the mirror upward. As lever 19 is restored to the position as shown in FIG. 4, the pin 19a rotates the projecting piece 13b of the governor control lever 13 clockwise with respect to FIG. 6 with a result that the other projecting piece 13a of control lever 13 is retracted from a range in which projecting piece 13a is engaged with the engaging piece 14b of the shutter rod 14, restoring said rod 14 to its initial position and holds the ankle 24 with the end 13c of said control lever 13 so as to block the operation of the governor mechanism. Thus all the operative parts including the device according to the invention are restored to the initial position, so that a series of operations as described above may be repeated to effect photography with the self-timer mechanism as t'  case demands.

With a photographic camera including the mechanism described above it is possible to take a photograph using a time shutter without incorporating a mechanism for said time shutter mechanism. In other words, the shutter release starting with the self-timer mechanism may be achieved, if operation of time shutter is intended, by setting the shutter mechanism to the bulb control condition. This is a condition in which the shutter rod 14 is prevented by the governor control lever 13 from being restored upwardly and said governor control lever 13 is adapted to be released, during the operation of depressing the shutter rod 14, from engaging effect on said shutter rod 14 at the end of shutter operation, i.e., because, after the shutter has been closed, the energy-storing lever 19 is restored to a position corresponding to that prior to storing energy. Said shutter mechanism under the bulb shutter control, therefore, is held open. If the shutter mechanism is switched to any time control shutter other than the bulb shutter after the lapse of an optional duration, said shutter mechanism goes into shutter-closing operation and due to restoration of the energy-storing lever 19, as mentioned above, taking place after the shutter has been closed, the self-timer mechanism including said shutter rod 14 and the camera mechanism are restored to the initial condition just as in the case previously mentioned.

While there has been described and illustrated a preferred embodiment of the present invention, it is apparent that numerous alterations, omissions and additions may be made without departing from the spirit thereof.

What is claimed is:

1. In combination with a camera including a shutter and a shutter control mechanism movable between an advance shutter release position actuating said shutter and a retracted position, a shutter release member movable between an advance and a retracted position, a spring-wound self-timer motor movable between a spring-wound advanced and a spring-unwound condition, means responsive to said motor being in at least a partially wound condition for releasably locking said shutter control mechanism against movement to a shutter release position, means responsive to the concurrent advance of said shutter release member and the unwound condition of said motor for releasing said shutter control mechanism to a shutter release position, means for releasably locking said shutter release upon advance thereof to said advanced position, and means responsive to the closing of said shutter for releasing said shutter release member for movement to its retracted position.

2. The combination of claim 1, including means for braking said motor, and means responsive to the retracted position of said shutter release member for locking said braking means in a motor-braking position.

3. The combination of claim 2 comprising a governor including an escape wheel rotatable with the unwinding of said timing motor, said braking means including means for restraining the rotation of said escape wheel.

4. The combination of claim 1, including first means for releasably locking said shutter mechanism in a cocked position, and means responsive to the unwinding of said motor for releasing said first shutter-locking means.

5. The combination of claim 4 including second means for releasably locking said shutter mechanism in a cocked position and means responsive to the advance of said shutter release member for releasing said second shutter-locking means.

6. The combination of claim 1, wherein said shutter release member comprises an axially slidable rod spring urged to a retracted position and including a first leg, and said shutter release member locking means includes a stop member spring urged into the path of said first leg and releasably locked in a position out of said path, and means responsive to the unwinding of said motor for releasing said stop member for movement into the path of said first leg.

7. The combination of claim 1, wherein said shutter release member includes a depressable rod spring urged to a raised position and having a projecting leg, said locking means comprises a pivoted lever including a first arm movable into and out of the path of said leg and said leg being in the path of said arm when said rod is in a raised position, spring means urging said lever to an advanced position with said arm registering with the path of said leg, means releasably locking said lever in a retracted position, and means responsive to the unwinding of said motor for releasing said lever locking means.

8. The combination of claim 7, including means responsive to the retraction of said lever for braking said motor.

9. In a camera including a shutter and a shutter control mechanism selectively adjustable to a preselected shutter open time and a bulb exposure control in which adjustment during the shutter open position from bulb exposure to a time-setting position effects the closing of said shutter, a self-timer spring-wound motor, a shutter release member movable between an advance and a retracted position, means responsive to the wound condition of said motor and the advance of said shutter control member for releasably locking said shutter control member in its advanced position, means responsive to the advance of said shutter control member and the unwound condition of said motor for actuating said shutter control mechanism to open said shutter, and means responsive to the closing of said shutter for releasing said shutter release member for return to its retracted condition whereby the advance of said shutter control member when said motor is wound and said shutter control mechanism is set to bulb effects the continued open condition of said shutter until said shutter control mechanism is switched from said bulb exposure setting.

* * * * *